O. A. COLBY.
ELECTRIC HEATING APPARATUS.
APPLICATION FILED DEC. 5, 1910.
1,068,740.
Patented July 29, 1913.
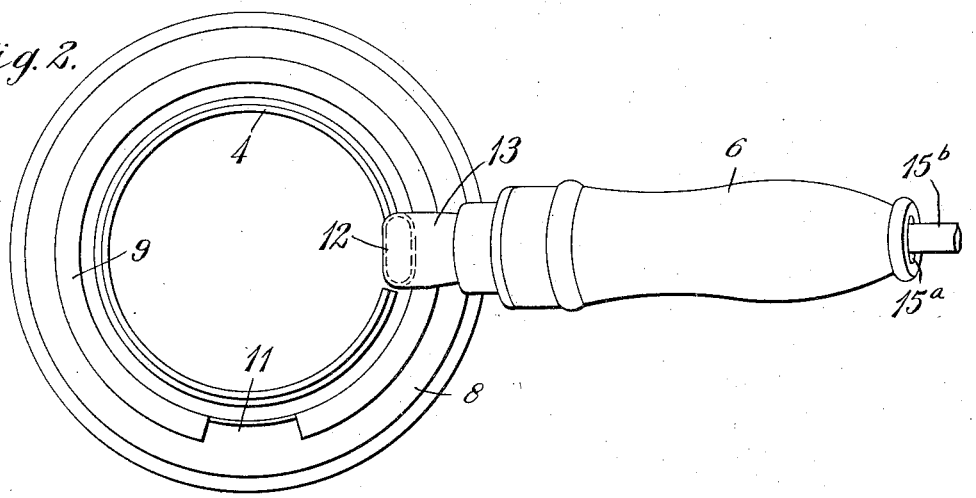
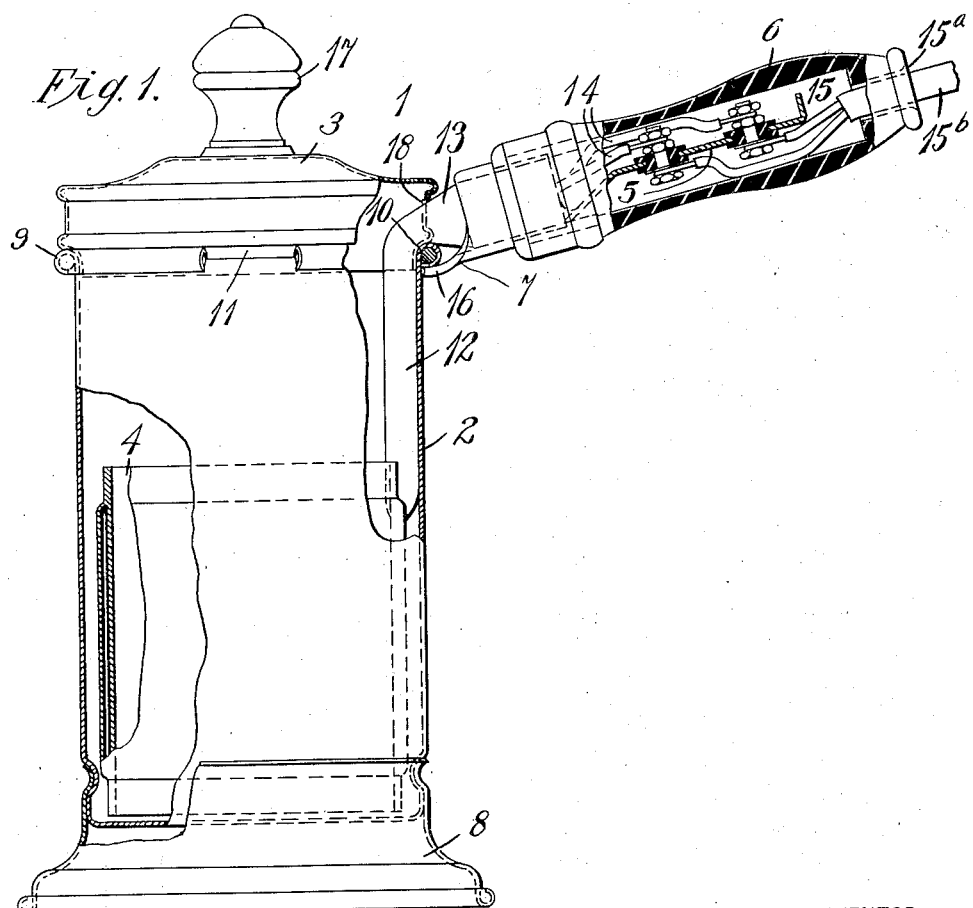
WITNESSES:
Fred H. Miller
D. W. Mace
INVENTOR
Ora A. Colby
BY
Wesley G. Carr
ATTORNEY

UNITED STATES PATENT OFFICE.

ORA A. COLBY, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC HEATING APPARATUS.

1,068,740.  Specification of Letters Patent.  Patented July 29, 1913.

Application filed December 5, 1910. Serial No. 595,677.

*To all whom it may concern:*

Be it known that I, ORA A. COLBY, a citizen of the United States, and a resident of Wilkinsburg, in the county of Allegheny and State of Pennsylvania, have invented a new and useful Improvement in Electric Heating Apparatus, of which the following is a specification.

My invention relates to electric heating apparatus, and it has particular reference to containing vessels.

The object of my invention is to provide a device of the above indicated class which shall be simple and durable in construction, and particularly adapted to reduce the number of component parts and to facilitate the process of manufacture of electric heating devices of this type.

According to my present invention, I provide an electric heating device which embodies a containing vessel, a suitable cover therefor, and a heater unit which is provided with a handle adapted to contain a suitable heater terminal member. Furthermore, the construction of the device is such that the heater unit is removably disposed within the vessel and may be secured in position by rotating the handle about the axis of the vessel, whereby the handle of the heater unit constitutes the handle of the entire device. It is manifest, therefore, that considerable reduction in cost of construction is effected; a particularly useful device which may be readily taken apart and cleaned, is obtained; and a device in which broken or defective parts may be easily removed and cheaply renewed, is provided.

My invention is illustrated in the accompanying drawings, in which—

Figure 1 is a view, in side elevation, of an electric heating device constructed in accordance with my invention, certain portions being broken away for clearness, and Fig. 2 is a plan view of the device shown in Fig. 1.

Referring to the drawings in detail, an electric heating device 1 comprises a containing vessel or receptacle 2, a cover 3 therefor, a heater unit 4, a terminal member 5, a handle 6 and a locking device 7. The receptacle 2, which is cylindrical in shape, is supported upon an integrally associated base 8 and is provided with an outwardly rolled upper edge 9 which partially surrounds the vessel. A wire ring 10 is disposed within the upper rolled edge 9 in order to lend rigidity thereto, and it will be observed that corresponding portions of the wire ring 10 and rolled edge 9 are removed to provide a break or opening 11, for a purpose to be hereinafter described.

The heater unit 4 is annular in form and may be of any suitable construction, although I prefer a resistance element of the zig-zag ribbon type interposed between suitable sheets of metal which are welded together at their edges to form a watertight and durable unit. A hollow sheath 12 forms an integral part of the heater unit 4 and is provided with a bent neck portion 13 which engages the upper side of the rolled edge 9 and sustains the heater unit in position. The sheath 12 is adapted to accommodate a plurality of leads 14 which connect the heater unit 4 to the terminal member 5.

The terminal member 5 may be of any suitable construction, although I prefer a structure similar to that shown and described in detail in a co-pending application, Serial No. 568,871, filed June 25, 1910, by the Westinghouse Electric & Manufacturing Company, as assignee of William S. Hadaway, Jr. Inasmuch as the structural details of the terminal member constitute no part of my invention, I consider it unnecessary to describe the same in the present application.

In order to protect the terminal member 5 and to provide means for readily handling the heater unit 4, the insulating handle 6 is provided, said handle having a recess 15 to accommodate the terminal member 5 and its necessary connections and an end opening 15$^a$ through which a multi-conductor service cord 15$^b$ extends. A projecting portion, or hook, 16 is provided on the neck portion 13 and extends inwardly to engage the under side of the rolled edge 9, whereby the heater unit 4 is rigidly secured in position in such manner that the handle 6 constitutes a handle for the entire electric heating device. The cover 3 may, of course, be of any desired construction and is provided with a handle or knob 17 and a side opening 18, through which the neck portion 13 of the sheath 12 projects.

Assuming the component parts of the heating device to occupy the positions shown in the drawings, the heater unit 4 may be removed by revolving the handle 6 about the axis of the vessel until the projecting portion 16 coincides in position with the break or opening 11 in the upper rolled edge 9. The heater unit 4 may then be raised and removed, as will be readily understood, the projecting portion 16 passing through the opening 11.

In assembling the device, heater unit 4 is placed within the vessel, and the handle 6 is moved so that the projecting portion 16 occupies a position corresponding to the opening 11, when the heater unit 4 may be lowered to its normal position. The handle 6 is then rotated about the axis of the vessel in either direction to cause coöperative engagement of the projecting portion 16 and the upper rolled edge 9, whereby the handle 6 is rigidly secured to the vessel 2.

Although the locking device 7 is particularly effective, it is, of course, only illustrative of many similar devices, and it is evident that various other suitable devices for accomplishing the same purpose may be employed. Furthermore, it will be understood that various other modifications in the structural details and in the arrangement and location of parts may be effected without departing from the spirit of my invention, and I desire that all such modifications shall be included within its scope.

I claim as my invention:

1. An electric heating device comprising a containing vessel having a laterally projecting rim section, a heater unit removably disposed in said vessel, a laterally projecting terminal member rigidly connected to said heater unit and provided with means for clamping said terminal member to said rim section and detachable therefrom by circumferential movement.

2. An electric heating device comprising a containing vessel, a heater unit removably disposed therein, a laterally projecting handle for said heater unit, a terminal member disposed within said handle and means for temporarily securing said handle to the rim of said vessel, so that said handle constitutes a handle for the entire device.

3. A device comprising a receptacle having a rolled upper edge provided with a gap, a heater unit removably disposed in said receptacle, a laterally projecting terminal member rigidly connected to said heater unit and located outside of said receptacle, a body of insulating material surrounding said terminal member and constituting a handle and a device projecting from said terminal member to engage the under side of said rolled edge in such manner that said handle is rigidly secured to said receptacle except when said device registers with the gap in the rolled edge.

4. A device comprising a cylindrical containing vessel having an outwardly rolled upper edge extending partially around said vessel, a heater unit removably disposed within said vessel, a handle rigidly secured to said heater unit, a terminal member disposed within said handle, a projecting member associated with said handle and adapted to engage the under side of said rolled upper edge to lock said handle to said vessel when said handle is moved in either direction from its initial unlocked position.

5. A device comprising a containing vessel having a circumferential edge projection provided with a gap, a heater unit removably disposed in said vessel, a laterally projecting handle rigidly connected to said heater unit and having a recess therein to receive the terminals of said heater unit and provided with a projection to engage the underside of the edge projection and thus lock the handle to the rim of the vessel except when registering with the gap in the edge projection.

6. The combination with a cylindrical vessel having an outwardly projecting portion near its upper edge and an annular heater unit removably disposed in said vessel, of a handle for said heater unit adapted to contain the terminals thereof and a projecting portion associated with said handle and adapted to coöperate with said outwardly projecting portion of said vessel, whereby the handle of said heater unit constitutes a handle for the vessel.

7. A receptacle comprising a containing vessel having an interrupted laterally projecting rim, a removable electric heating member disposed in said vessel, a laterally projecting handle for said heating member having means for engaging said rim to effect locking and unlocking engagement between the handle and the vessel as the handle is moved circumferentially with reference to the axis of the vessel.

In testimony whereof, I have hereunto subscribed my name this 22nd day of November, 1910.

ORA A. COLBY.

Witnesses:
BERTRAM D. COBNER,
B. B. HINES.